UNITED STATES PATENT OFFICE.

WILLIAM MORRISON, OF DES MOINES, IOWA.

STORAGE BATTERY.

1,058,778. Specification of Letters Patent. Patented Apr. 15, 1913.

No Drawing. Application filed August 31, 1912. Serial No. 718,158.

*To all whom it may concern:*

Be it known that I, WILLIAM MORRISON, a citizen of the United States, residing at Des Moines, in the county of Polk and State of Iowa, have invented certain new and useful Improvements in Storage Batteries, of which the following is a specification.

This invention relates to the production of a permanent and insoluble binder for the active material of positive-pole lead storage batteries. The binder comprises an oxygen compound of a metal, such as titanium, any of the oxids of which when fused with an alkaline hydrate or oxid, such as potassium hydrate, form a salt. I prefer to use ordinary potassium titanate.

The alkaline titanate is dissolved to saturation in preferably about a twelve volume solution of hydrogen peroxid, to which is then added a similar quantity of the hydrogen peroxid solution equal to that used for solution of the alkaline titanate. To the solution thus obtained is added gradually, and with stirring, about an equal volume of sulfuric acid of specific gravity of 1.300; however, the proportions herein given may be varied within reasonable limits. The resulting solution is ready for use.

A thoroughly formed positive-pole electrode, fully charged and expanded, is immersed in the above solution until a quantity sufficient for the purpose has been absorbed; this may be accomplished by repeatedly dipping and drying, or by leaving the plate in the solution for a considerable time until sufficient titanium compound has been absorbed. The treated plate is now immersed in a suitable sulfuric acid solution of about 1.300 specific gravity, and charged, as an anode, until the plate is fully oxidized and the soluble matter removed; after which the plate is rinsed and is ready for use in a storage battery. The process of saturating the plate and oxidizing may be repeated if desired. A formed and charged Planté plate may also be treated as above described the resulting plate possessing the advantage of the treated pasted plate. The titanium exists in the plate as an oxygen-containing compound, and probably plays the same rôle as the sulfur-oxygen anion in ordinary lead electrodes when lead sulfate constitutes the binder.

Other methods of preparing the plate may be used, for example, the sulfuric acid solution containing the titanium and hydrogen peroxid may be added in sufficient quantity to the dry lead oxids, and the paste worked into the grids as usual. Or the electrode may be connected as an anode in an electrolyte of an alkaline titanate solution, and saturated with the titanium compound by electrolysis.

It is to be understood that the foregoing example is illustrative in character only, and that it is not intended to limit the process or the strength of solutions or proportions of reagents used.

I claim:

1. In an electrode for an electrolytic cell, a binder consisting of a compound of titanium.

2. In an electrode containing lead oxid, for an electrolytic cell, a binder consisting of a compound of titanium.

3. In a storage battery electrode, a binder containing a titanium compound.

4. In a positive-pole electrode for storage batteries, a binder containing a titanium compound.

5. In a positive-pole electrode for storage batteries, a binder consisting of a compound containing titanium and oxygen.

6. The process of binding the active material of storage battery electrodes, comprising adding a solution containing a titanium compound to the active material of the electrode.

7. The process of binding the active material of storage battery electrodes, comprising adding to a charged electrode a solution containing an oxygen compound of titanium.

8. The process of binding the active material of storage battery electrodes, comprising forming the electrode, charging the electrode, adding a solution containing a titanium compound to the active material, and recharging the electrode.

9. The process of binding the active material of storage battery electrodes, comprising adding a solution of a titanate to hydrogen peroxid, adding sulfuric acid, adding the resulting solution to the active material of a charged positive-pole electrode, and recharging the electrode.

10. The process of binding the active material of storage battery electrodes, comprising adding a soluble titanate to hydrogen peroxid, adding sulfuric acid to the hydrogen peroxid solution, adding the resulting solution to the active material of an electrode, and oxidizing the electrode.

In testimony whereof I affix my signature in presence of two witnesses.

WILLIAM MORRISON.

Witnesses:
PERCY H. MOORE,
JOSEPH W. HARRIS.

Copies of this patent may be obtained for five cents each, by addressing the "Commissioner of Patents, Washington, D. C."